US011006619B2

(12) United States Patent
Gudesen

(10) Patent No.: US 11,006,619 B2
(45) Date of Patent: May 18, 2021

(54) AQUATIC BIOFILTRATION SYSTEM

(71) Applicant: Hans Gude Gudesen, Lucerne (CH)

(72) Inventor: Hans Gude Gudesen, Lucerne (CH)

(*) Notice: Subject to any disclaimer, the term of this patent is extended or adjusted under 35 U.S.C. 154(b) by 0 days.

(21) Appl. No.: 16/603,576

(22) PCT Filed: Apr. 6, 2018

(86) PCT No.: PCT/NO2018/050095
§ 371 (c)(1),
(2) Date: Oct. 7, 2019

(87) PCT Pub. No.: WO2018/186753
PCT Pub. Date: Oct. 11, 2018

(65) Prior Publication Data
US 2020/0120908 A1 Apr. 23, 2020

(30) Foreign Application Priority Data

Apr. 7, 2017 (NO) .................................. 20170595

(51) Int. Cl.
A01K 63/04 (2006.01)
A01K 61/60 (2017.01)
A01K 61/54 (2017.01)
C02F 3/32 (2006.01)

(52) U.S. Cl.
CPC ............ *A01K 63/045* (2013.01); *A01K 61/54* (2017.01); *A01K 61/60* (2017.01); *A01K 63/04* (2013.01); *C02F 3/327* (2013.01); *Y02A 40/81* (2018.01); *Y02W 10/10* (2015.05)

(58) Field of Classification Search
CPC ...... A01K 63/045; A01K 61/60; A01K 61/54; A01K 63/04; C02F 3/327; Y02W 10/18; Y02A 40/822; Y02A 40/826

USPC ............ 210/602, 615, 167.22; 119/227, 260
See application file for complete search history.

(56) References Cited

U.S. PATENT DOCUMENTS 6,544,560 B1* 4/2003 Bullent .................. A01K 61/54
424/520
2004/0240945 A1* 12/2004 Frantz ...................... E02D 5/60
405/216
2014/0020283 A1* 1/2014 Troedsson ............. A01K 61/00
44/307

FOREIGN PATENT DOCUMENTS

CN 101073316 A 11/2007
EP 1508272 A1 2/2005
KR 20070038872 A 4/2007

OTHER PUBLICATIONS

Machine-generated English translation of KR10-2007-0038872, generated on Jul. 28, 2020.*
Machine-generated English translation of CN 101073316, generated on Jul. 28, 2020.*
English language Abstract of CN 101073316 A (Nov. 21, 2007).
(Continued)

*Primary Examiner* — Fred Prince
(74) *Attorney, Agent, or Firm* — Hershkovitz & Associates, PLLC; Abe Hershkovitz

(57) ABSTRACT

An aquatic biofiltration system where invertebrate aquatic filtering organisms in the form of tunicates filter free-floating particulates in a water volume is disclosed. The system provides a habitat for tunicates with at least one residence device (5, 6) adapted to be arranged in a water volume, and a collection system (7) adapted to collect expelled solids from the tunicates. A biofiltration method for filtering particulates from a volume of water is also disclosed.

18 Claims, 4 Drawing Sheets

(56) References Cited

OTHER PUBLICATIONS

International Search Report in International Application No. PCT/NO2018/050095, dated Feb. 7, 2018.
Written Opinion of the International Searching Authority in International Application No. PCT/NO2018/050095, dated Feb. 7, 2018.

* cited by examiner

AQUATIC BIOFILTRATION SYSTEM

FIELD OF THE INVENTION

The present invention generally relates to an aquatic biofiltration system where invertebrate aquatic filtering organisms in the form of tunicates extract free-floating particulates from a water volume expelling solids which are collected for later use, and a method related to the biofiltration system.

BACKGROUND

Much of the organic nutrient matter in the oceans and waterways of the Earth exists in the form of highly dispersed microparticulates, e.g. phytoplankton (autotrophic prokaryotic or eukaryotic algae), zooplankton that feed on other plankton (including eggs and larvae of larger animals), bacterioplankton (bacteria and archaea) and mycoplankton (fungi and fungus-like organisms). This biomass represents a vast source of essential foodstuffs that sustain life through a series of trophic levels up to and including man. It is generally acknowledged that the amount of food passed on at each step in the food chain is reduced by approximately a factor of ten. This implies that there exists a large potential for increasing the amount of food harvested from the sea by increasing the proportion of food from low trophic level organisms such as phytoplankton and zooplankton. A major obstacle to this approach is that these resources generally are very diverse and exist dispersed at low density in large volumes of water which often contains inorganic particulates and is populated by pelagic fauna, making it difficult to apply large scale harvesting techniques based on fine meshed sieves. An indirect strategy for harvesting planktonic biomass is to take one step up on the trophic ladder and harvest filtering organisms that naturally sift through large volumes of water, selecting organic matter and producing useful biomass. Examples are farming operations for filtering organisms such as bivalves (e.g.: mussels, oysters, clams, scallops) and tunicates on installations in open water and in closed habitats such as cages and ponds. While this approach has proven highly successful, the fact remains that only a small proportion of the total biomass captured by the filtering organisms is incorporated in their bodies in the form of food and useful biomaterials. The rest is either consumed in their metabolism or excreted in partly digested or non-digested form as feces or pseudofeces. In intensive marine farming operations involving filtering organisms as well as fish, accumulation of fecal matter and unused foodstuffs near the farms are known to cause severe deterioration of the local marine environment, a problem which has so far been largely ignored in the industry.

Recently, there has been a raised awareness of the problems posed by microplastic ocean pollution. This stems from plastic materials that have been dumped in the ocean and subsequently have been degraded, resulting in fragmentation of the plastic into smaller and smaller parts. Ultimately, the plastic is comparable to plankton in size and is ingested by and accumulated in marine organisms. This represents a huge and growing problem worldwide, and remedies are very difficult to find and implement, due to the diffuse distribution of the particles in question and their small size.

Problems to be Solved by the Invention

Thus there exists a need for new concepts and technologies that allow large scale and cost effective harvesting of nutrient matter from the sea at the lowest trophic levels.

There is further a need for new concepts and technologies for cleaning large volumes of water, in particular near locales where intensive farming of fish and other sea organisms takes place and near effluents of contaminated water.

There is also a need for new concepts and technologies that allow extraction of small, non-edible particles such as microplastics from large volumes of seawater.

A major object of the present invention is to exploit the value in feces and pseudofeces from filter-feeding marine organisms. Pseudofeces are particles expelled by many marine filtering organisms, either because they are inedible (e.g. grit) or because the organisms cannot cope with the amount or type of food ingested by them. The rejected particles are wrapped in mucus, and are then expelled without having passed through the digestive tract. The feces and pseudofeces are emitted as small pellets that typically sediment in water at a rate of approximately 1 meter per minute. This is adequate for various types of collection and concentration processes, including gravity traps and cyclones. In the tunicate case, the expelled solids represent more than 90% undigested primary production (microalgae), representing a great value as raw material for production of food, fertilizers and chemicals.

It is further a major object of the present invention to provide unique capabilities in purification of water containing highly dispersed small-sized particles.

It is further a major object of the present invention to scavenge $CO_2$ from the environment by concentrating and binding marine organic material in a form suitable for processing and high end applications.

Further objects are to overcome problems with known solutions.

The Means Required to Solve the Problems

The objectives are achieved according to the invention by an aquatic biofiltration system having the features of independent claim 1, and an aquatic biofiltration method having the features of the corresponding independent claim.

SUMMARY OF THE INVENTION

The present invention teaches the use of a biofiltration system based on marine sessile or immobilized filtering organisms in the form of tunicates to extract and concentrate free-floating particulates, in particular nutrient matter from large volumes of water. In contrast to prior art farming operations involving marine filtering organisms such as oysters, scallops, etc. where the goal is to harvest the organisms and extract the biomass accumulated in them during their lifetime, the present invention teaches how to incorporate the tunicates as part of the production machinery in the system and exploit their ability to sift through large volumes of water and trap selectively small-sized fractions of particulates, followed by expulsion of feces and undigested matter in a form which permits efficient harvesting by well-known separation technologies, e.g. sedimentation or sieving.

The organic fractions in harvested matter from the ocean shall generally represent a valuable resource, e.g. as food for higher trophic level organisms, as fertilizer or as feedstock in industrial processes. In addition, the biofiltration system acts as a water purifying system.

The biofiltration system provides an underwater habitat with a macroscopic structural framework supporting a plurality of attachment surfaces for the tunicates, and a capture system in the water below or in a downstream flow for collection of fecals and other solids expelled by the organisms.

The nutrients that are presented to the tunicates in the system may be in the form of naturally occurring planktons or anthropogenic organic waste. Two types of biofiltration systems are of relevance here:

In the first, the system is open to the surrounding environment and nutrients are carried by water that drifts through the system. When the system is deployed in open stretches of water, this allows for opportunistic harvesting of plankton. A more focused approach is to position the system downstream along the prevailing water drift direction from a fish farm to intercept fecal matter and fodder not consumed by the fish, or to position the system close to a sewer effluent.

In the second, the system is enclosed by a barrier preventing free water exchange between the interior and exterior of the system, and nutrients are introduced from an external source. This provides complete control of mass flow through the system.

Both types of systems are equipped with traps in the water below the filtering organisms to collect sedimenting organic matter, i.e. feces and pseudofeces as well as excess nutrients expressed by the filtering organisms. The trapped material, which represents the basic production output of the biofiltration system, is pumped to collection tanks and processed for uses in high end products such as foodstuffs, fertilizers, pharmaceuticals and biodiesel. Optionally, the tunicates in the system may contribute useful biomass by being harvested at suitable intervals, or they may be discarded and replaced by a fresh stock of tunicates at a certain point in their lifecycle. In some cases the tunicates may be left undisturbed for long periods of time. By focusing on the waste products instead of the biomass in the filtering organisms themselves, farming infrastructure becomes less complex and operational logistics are greatly simplified, permitting highly automated, continuous operation.

A first aspect of the invention is an aquatic biofiltration system arranged in a water volume, where the system provides a habitat for tunicates. The system comprises:
  at least one tunicate residence device with at least one attachment surface for tunicates;
  a plurality of tunicates attached to the attachment surface, where the plurality of tunicates filter free-floating particulates in the water volume and expel solids in the form of at least one of the following: feces, pseudofeces and undigested matter; and
  a collection system adapted to collect the expelled solids from the plurality of tunicates.

Optionally, the attachment surface comprises one or more of the following:
  a surface in the form of a sheet, ribbon or tape,
  a rope, tube, ladder,
  multiple sheets forming a connected structure,
  an elongated sheet adapted to be suspended vertically in the water volume, and
  a stiff planar surface in the form of a disc, a plate or a tray.

Optionally, the aquatic biofiltration system further comprises a structural framework for supporting the at least one residence device, where the structural framework comprises a perimeter with walls adapted to vertically surround the habitat, upper and lower platforms adapted to horizontally surround the habitat, and suspension infrastructure for carrying the at least one residence device.

The collection system can comprise a collection surface enveloping a collection chamber, where the collection surface is adapted to be arranged below the habitat to collect in the collection chamber the expelled solids, and the collection surface can be adapted to be arranged mainly with a downward inclination towards a point or a line for allowing gravity to contribute to the collecting. The collection surface can be funnel-shaped or wedge-shaped.

When connected to the collection chamber, the collection system further can comprise a separation device for separating the solids and purified water.

The collection system can comprise a collection tank for collecting the solids, where the collection tank is connected to the separation device via a collection tube.

The biofiltration system can be an open system adapted to allow surrounding water to flow through the habitat.

The structural framework can comprise a perimeter with open walls adapted to vertically surround the habitat, upper and lower platforms adapted to horizontally surround the habitat, and suspension infrastructure for carrying the at least one residence device.

The biofiltration system can be a closed system adapted to separate the habitat from the surrounding water preventing it from flowing through the habitat.

A second aspect of the invention is a biofiltration method for filtering particulates from a volume of water, comprising the steps of:
  deploying invertebrate aquatic filtering organisms in the form of tunicates on one or more residence devices in the volume of water,
  exposing the tunicates to water carrying particulates,
  filtering the particulates and expelling solids in the form of feces, pseudo-feces and/or undigested matter, where the filtering and expelling is performed by the tunicates, and
  collecting the expelled solids.

The biofiltration method can comprise the step of selecting one or more species of tunicates that feed on the particulates.

The step of exposing can comprise exposing the tunicates to water carrying particulates from an open marine environment.

The step of exposing can comprise exposing the tunicates to water carrying particulates from a marine farming operation and/or a sewer effluent.

A third aspect of the invention is a water purification method comprising the steps of the biofiltration method, and using the method to purify the water traversing the aquatic biofiltration system.

BRIEF DESCRIPTION OF THE DRAWINGS

Note that figures are not to scale and effects illustrated can be simplified or exaggerated to easier explain the concepts.

DETAILED DESCRIPTION OF THE INVENTION

Figure 1:
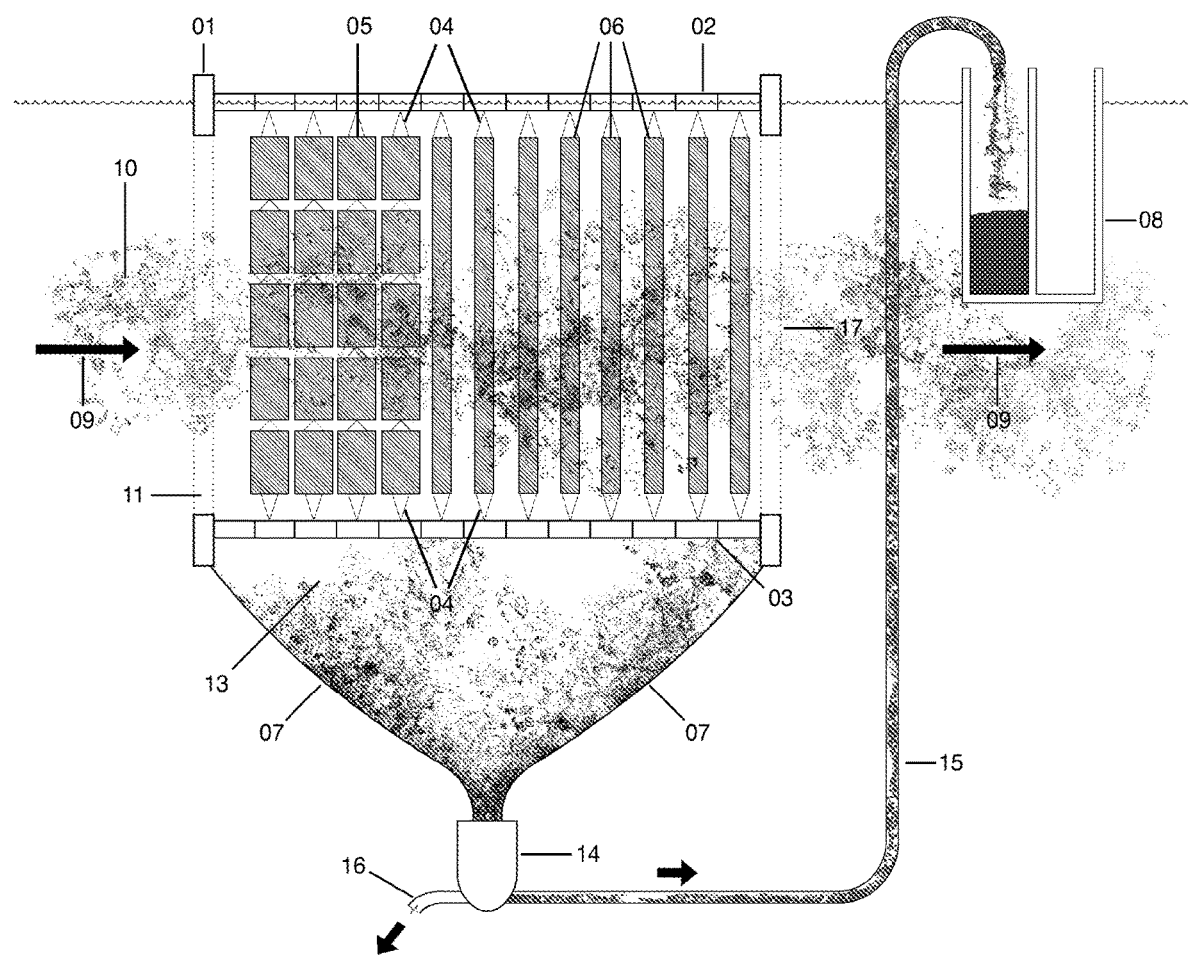
FIG. 1 shows an open aquatic biofiltration system.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The invention will be further described in connection with exemplary embodiments which are schematically shown in the drawings.

The aquatic biofiltration system typically comprises:
- an underwater habitat populated by filtering organisms in the form of tunicates,
- means for providing a flow of water through the habitat, carrying nutrients for the filtering organisms and particulates that can be captured by the filtering organisms and removed from the water,
- means for collecting fecals and expelled solids from the filtering organisms
- means for transferring the collected material to recipients or processing infrastructure.

The collected material shall typically be in the form of a sludge with water content that may vary widely, depending on the collection and separation processes used. In the case where the tunicates feed primarily on plankton, the sludge may be processed to provide animal feed with high omega 3 content. If there is a high fraction of inedible particulates, the post collection processing must include separation steps to remove them. Microplastic particulates require particular attention in this regard, since they may carry toxic material.

In order to promote understanding of the present invention, some embodiments shall now be described in more detail:

FIG. 1 shows an open aquatic biofiltration system where the surrounding masses of water are free to flow through the habitat where the filtering organisms live. In the current context, biofiltration relates to filtration where filtering organisms in the form of tunicates are actively involved. Dispersed particulates that are carried with the water are brought in contact with the tunicates and captured, and feces and expelled solids are collected. In FIG. 1 a macroscopic structural framework includes a perimeter with vertical walls (1) that surround the habitat, upper (2) and lower (3) platforms, suspension infrastructure (4) carrying the residence devices (5), (6) for the tunicates, a collection surface (7) and a collection tank (8). A water flow (9) carries particulates (10) through the open sidewalls (11) and past a plurality of residence devices which are loaded with tunicates. Two types of residence devices are shown: The first is a set of stiff planar surfaces in the form of discs, plates or trays. The second is a set of elongated sheets (6) suspended vertically in the water, both types providing attachment surfaces for tunicates. The residence devices are suspended between the upper and lower platforms (2), (3), in a volumetric pattern which provides efficient transport of water to and from the tunicates. The lower platform (3) has openings to allow passage of water and solids sedimenting from the volume above containing the tunicates. A collection surface (7) envelops a collection chamber (13) in the lower part of the aquatic biofiltration infrastructure. In FIG. 1 it is a funnel-shaped sheet, but other solutions are possible. Sedimenting solids are carried by gravity and water flow to a separation and pumping device (14), from which a fraction of the water flow which is enriched in solids is transported through a tube (15) and deposited in the collection tank (8) while the rest is emitted as purified water through the tube (16).

Figure 2:
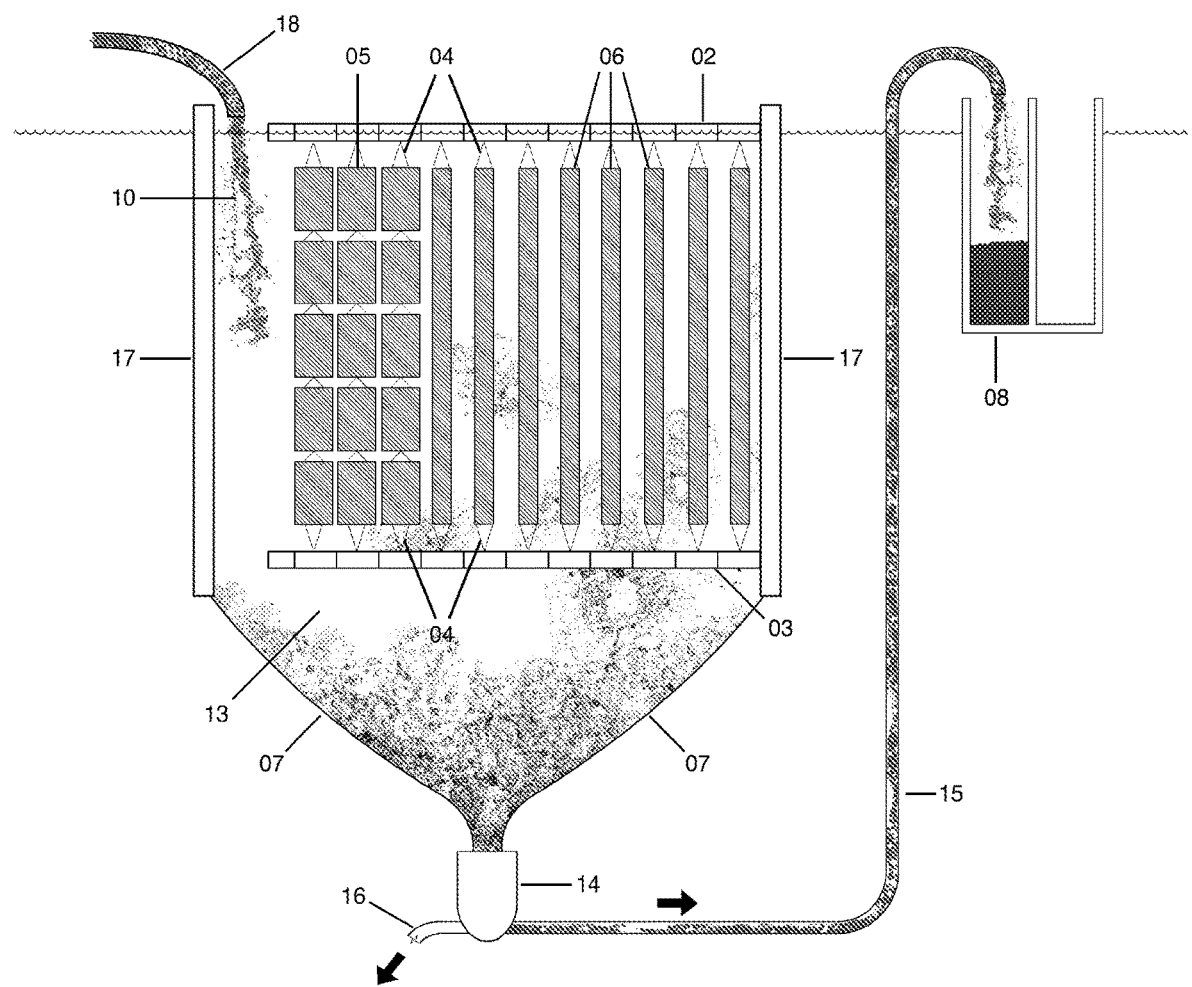
FIG. 2 shows a closed aquatic biofiltration system.

FIG. 2 shows a closed aquatic biofiltration system. While the basic configuration is similar to the open system shown in FIG. 1, it differs in some key aspects: The volume containing the tunicates is separated from the surrounding volume of water by a barrier wall (17) and a collection surface (7), and nutrients and particulates are supplied in a controlled fashion from an outside source: As shown in FIG. 2, water with fractions of coarse and fine particles (10) enters through an inlet tube (18) and spreads throughout the enclosed volume. The coarse fractions of the particulates sediment quickly and are collected by the funnel-shaped collection surface (7). The finer fractions of particulates sediment slowly and float in the water through the volume occupied by the tunicates on the residence devices (5), (6). Fecal and rejected matter from the tunicates sediment to the collection chamber (13) at the bottom of the aquatic biofiltration system and is collected by the collection surface (7). Sediments near the collection surface are transported by gravity and water flow towards the funnel at the bottom, which feeds into a separation and pumping device (14). Concentrated particulates are pumped via a tube (15) into a collection tank (8) for further processing, while purified water is directed through another tube (16).

Figure 3A:
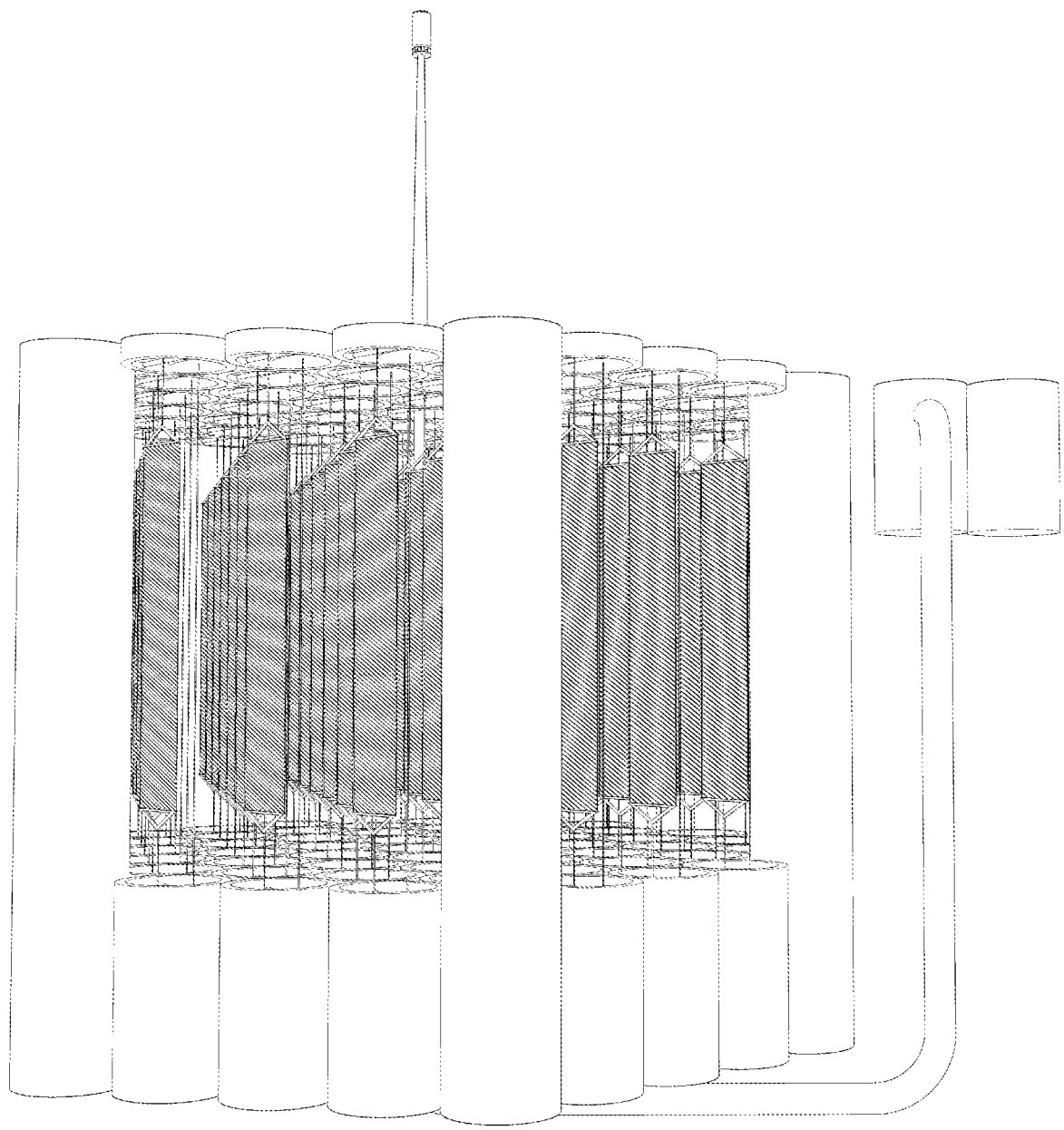
FIGS. 3a and 3b show outside and section views, respectively, of an open aquatic biofiltration system similar to the one shown in FIG. 1.
Figure 3B:
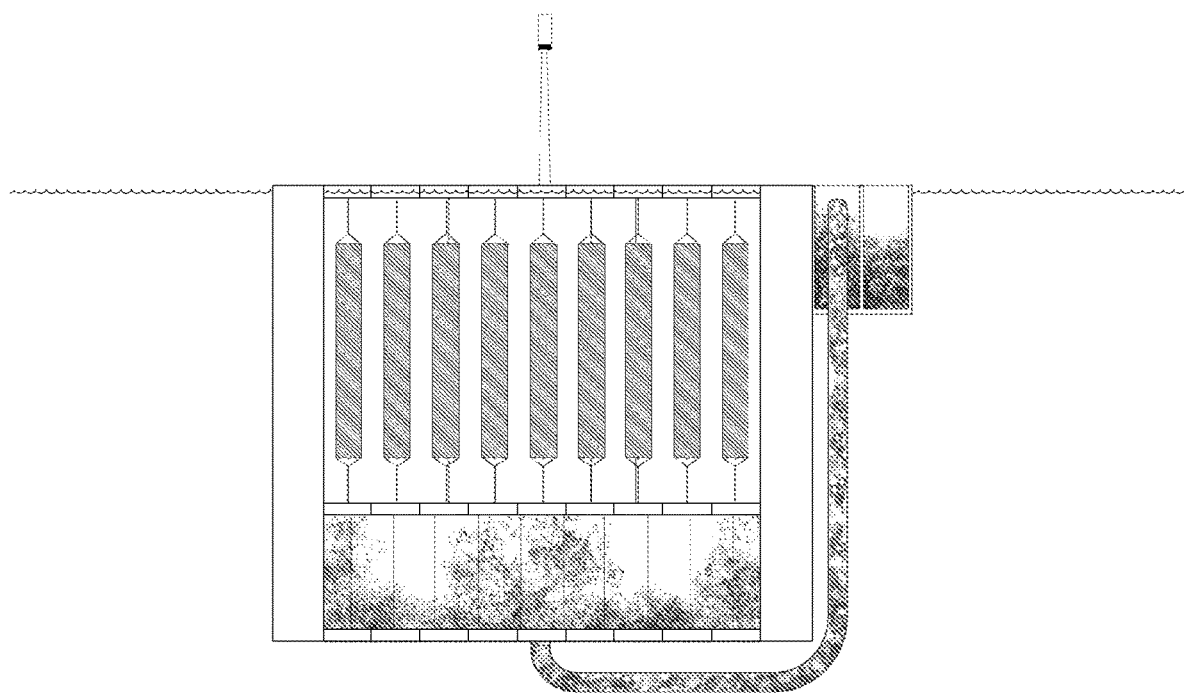

FIGS. 3a and 3b show outside and section views, respectively, of an open aquatic biofiltration system similar to the one shown in FIG. 1 where the collection chamber is protected by a barrier wall. In FIG. 3b the collection chamber is shown as an unstructured void which may be fitted with collection surfaces and/or devices of various kinds.

The aquatic biofiltration system shall involve the following generic steps:

i) Deploy the tunicates in a plurality of residence devices in a volume of water. The tunicates, e.g. *Ciona intestinalis*, are sessile in their adult form, and once settled shall remain attached to a surface. This is the basis for employing structures with large settling surfaces which provide good contact with the surrounding water volume. The surfaces may take many forms, e.g. stretched sheets, tubes, boxes, disks, ropes or ladders. Depending on the type and number of residence devices deployed at a given location, they shall be arranged in a 3 dimensional pattern in the available space to provide optimal interaction with the water volume. This may imply radically different configurations depending on the locale, which may be an open stretch of ocean, a shallow tidal flat, a river estuary, a sewage plant outlet, etc.

ii) Expose the tunicates to water carrying particulate and dissolved nutrients. Two basically different modes of operation present themselves: In the first, the system is open and exposed to the surrounding water, and the particulates are carried into contact with the filtering organisms by water currents. This shall typically be the case when the object is to capture planktonic matter from large water volumes. It is also relevant in the case where the aquatic biofilter system is positioned near a marine farming facility such as a fish or oyster farm. Both are notorious for leaking large amounts of fecal matter to the surrounding environment, and fish farms also lose large amounts of uneaten fish food. Aquatic biofiltration systems may in such cases surround whole or part of such facilities, or be judiciously localized in prevailing downstream directions. In the second mode of operation, the aquatic biofiltration system is closed to the surrounding water, and all feedstock is brought into the volume where the filtering organisms reside from a controlled source, typically in a stream of water. After passing through the region containing the filtering organisms, the water flux into the closed system is balanced by water that exits through a collection system which sorts out the solid matter.

iii) Collect the following:
Fecal matter eliminated from the filtering organisms,
Undigested matter expressed from the filtering organisms,
Organic materials and feedstock not consumed by the filtering organisms.

Both open and closed aquatic biofiltration systems incorporate a collection system based on gravity separation to extract particulates from the water. This typically involves sedimentation whereby the particles are allowed to settle on a collection surface, e.g. a stretched-out sheet. This surface shall typically extend horizontally underneath the residence devices and may be shaped with inclined surfaces, e.g. a funnel or wedge that guides the particulates and transports them to collection points at the bottom, where suction pulls the particulates into a tube for transportation to a holding tank or a second separator device. An alternative to passive sedimentation is cyclone technology which is currently employed in the fish farming industry, cf. e.g. commercial equipment delivered by the Norwegian firm Aqua Optima, Trondheim.

The invention claimed is:

1. An aquatic biofiltration system arranged in a water volume, wherein the system provides a habitat for tunicates, and comprises:
   at least one tunicate residence device with at least one attachment surface for tunicates;
   a plurality of tunicates attached to the attachment surface, wherein the plurality of tunicates filter free-floating particulates in the water volume and expel solids in the form of at least one of the following: feces, pseudofeces and undigested matter;
   a collection system adapted to collect the expelled solids from the plurality of tunicates;
   wherein the collection system comprises a collection surface enveloping a collection chamber, wherein the collection surface is adapted to be arranged below the habitat to collect the expelled solids in the collection chamber;
   wherein, connected to the collection chamber, the collection system further comprises a separation device for separating the solids and purified water.

2. Aquatic biofiltration system according to claim 1, where the attachment surface comprises one or more of the following:
   a surface in the form of a sheet, ribbon or tape,
   a rope, tube, ladder,
   multiple sheets forming a connected structure,
   an elongated sheet adapted to be suspended vertically in the water volume, and
   a stiff planar surface in the form of a disc, a plate or a tray.

3. Aquatic biofiltration system according to claim 2, wherein the collection system comprises a collection surface enveloping a collection chamber, wherein the collection surface is adapted to be arranged below the habitat to collect the expelled solids in the collection chamber.

4. Aquatic biofiltration system according to claim 2, comprising a structural framework for supporting the at least one residence device, wherein the structural framework comprises a perimeter with walls adapted to vertically surround the habitat, upper and lower platforms adapted to horizontally surround the habitat, and suspension infrastructure for carrying the at least one residence device.

5. Aquatic biofiltration system according to claim 4, wherein the collection system comprises a collection surface enveloping a collection chamber, wherein the collection surface is adapted to be arranged below the habitat to collect the expelled solids in the collection chamber.

6. Aquatic biofiltration system according to claim 1, comprising a structural framework for supporting the at least one residence device, where the structural framework comprises a perimeter with walls adapted to vertically surround the habitat, upper and lower platforms adapted to horizontally surround the habitat, and suspension infrastructure for carrying the at least one residence device.

7. Aquatic biofiltration system according to claim 1, wherein the collection surface is adapted to be arranged mainly with a downward inclination towards a point or a line for allowing gravity to contribute to collecting.

8. Aquatic biofiltration system according to claim 7, wherein the collection surface is funnel-shaped or wedge-shaped.

9. Aquatic biofiltration system according to claim 1, wherein the collection system further comprises a collection tank for collecting the solids, wherein the collection tank is connected to the separation device via a collection tube.

10. Aquatic biofiltration system according to claim 1, wherein the biofiltration system is an open system adapted to allow surrounding water to flow through the habitat.

11. Aquatic biofiltration system according to claim 1, wherein the biofiltration system is a closed system adapted to separate the habitat from surrounding water preventing it from flowing through the habitat.

12. An aquatic biofiltration system arranged in a water volume, wherein the system provides a habitat for tunicates, and comprises:
    at least one tunicate residence device with at least one attachment surface for tunicates;
    a plurality of tunicates attached to the attachment surface, wherein the plurality of tunicates filter free-floating particulates in the water volume and expel solids in the form of at least one of the following: feces, pseudofeces and undigested matter;
    a collection system adapted to collect the expelled solids from the plurality of tunicates;
    wherein the biofiltration system is an open system adapted to allow surrounding water to flow through the habitat;
    wherein a structural framework comprises a perimeter with open walls adapted to vertically surround the habitat, upper and lower platforms adapted to horizontally surround the habitat, and suspension infrastructure for carrying the at least one tunicate residence device.

13. A biofiltration method for filtering particulates from a volume of water using an aquatic biofiltration system, the biofiltration system being arranged in a water volume, wherein the biofiltration system providing a habitat for tunicates, and comprising:
    at least one tunicate residence device with at least one attachment surface for tunicates;
    a plurality of tunicates attached to the attachment surface, wherein the plurality of tunicates filter free-floating particulates in the water volume and expel solids in the form of at least one of the following: feces, pseudofeces and undigested matter;

a collection system adapted to collect the expelled solids from the plurality of tunicates;

wherein the collection system comprises a collection surface enveloping a collection chamber, wherein the collection surface is adapted to be arranged below the habitat to collect the expelled solids in the collection chamber;

wherein, connected to the collection chamber, the collection system further comprises a separation device for separating the solids and purified water;

the biofiltration method comprising:

deploying invertebrate aquatic filtering organisms in the form of tunicates on the at least one tunicate residence device in the volume of water;

exposing the tunicates to water carrying particulates;

filtering the particulates and expelling solids in the form of feces, pseudo-feces and/or undigested matter, wherein the filtering and expelling is performed by the tunicates; and collecting the expelled solids.

14. Biofiltration method according to claim 13, further comprising:

selecting one or more species of tunicates that feed on the particulates.

15. Biofiltration method according to claim 13, wherein the step of exposing comprises exposing the tunicates to water carrying particulates from an open marine environment.

16. Biofiltration method according to claim 13, wherein the step of exposing comprises exposing the tunicates to water carrying particulates from at least one of, a marine farming operation and a sewer effluent.

17. Biofiltration method according claim 13, wherein the method is used to purify water traversing the aquatic biofiltration system.

18. An aquatic biofiltration system arranged in a water volume, wherein the system provides a habitat for tunicates, and comprises:

at least one tunicate residence device with at least one attachment surface for tunicates;

a plurality of tunicates attached to the attachment surface, wherein the plurality of tunicates filter free-floating particulates in the water volume and expel solids in the form of at least one of the following: feces, pseudofeces and undigested matter;

a collection system adapted to collect the expelled solids from the plurality of tunicates;

wherein the collection system comprises a collection surface enveloping a collection chamber, wherein the collection surface is adapted to be arranged below the habitat to collect the expelled solids in the collection chamber;

wherein the collection surface is adapted to be arranged mainly with a downward inclination towards a point or a line for allowing gravity to contribute to collecting the expelled solids; and wherein the collection surface is one of, funnel-shaped or wedge-shaped.

* * * * *